A. W. MORSE.
GREASE GUN.
APPLICATION FILED AUG. 8, 1916.
1,248,526. Patented Dec. 4, 1917.
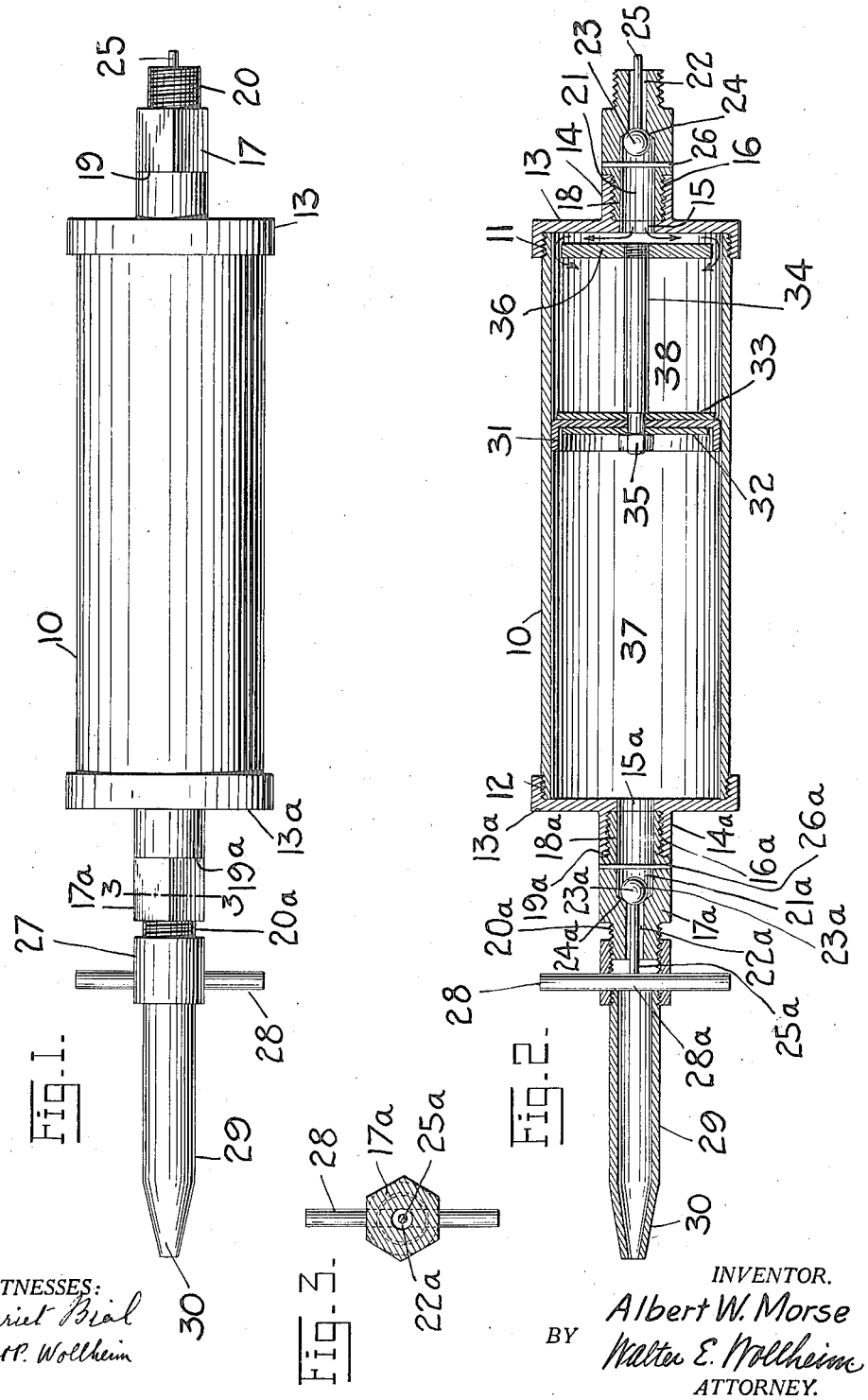
WITNESSES:
Harriet Bial
Albert P. Wollheim
INVENTOR.
Albert W. Morse
BY Walter E. Wollheim
ATTORNEY.

UNITED STATES PATENT OFFICE.

ALBERT W. MORSE, OF NEW YORK, N. Y.

GREASE-GUN.

1,248,526.

Specification of Letters Patent.   Patented Dec. 4, 1917.

Application filed August 8, 1916.  Serial No. 113,734.

*To all whom it may concern:*

Be it known that I, ALBERT W. MORSE, a citizen of the United States, residing at New York, in the county and State of New York, have invented certain new and useful Improvements in Grease-Guns, of which the following is a specification.

This invention refers to improvements in devices used to store, transport and transfer lubricants, commonly called grease guns which are employed to introduce a lubricant into grease cups or similar vessels, or into bearings or gears of machinery, and has for its particular object simple means for the handling of the device and for the ejecting of the lubricant.

Other objects of the invention are the elimination of any physical efforts in ejecting the lubricant and also to make such devices absolutely leak proof which is conducive to cleanliness.

With these and other objects in view, the invention consists in certain novel features of construction, as hereinafter shown and described and then particularly pointed out in the claims and in the drawings, illustrative of the preferred embodiment of the invention.

In the drawings, Figure 1 shows an exterior view of the device; Fig. 2 shows a longitudinal section through the same, and Fig. 3 a cross sectional view along the plane of line 3—3 in Fig. 1.

Like characters of reference denote similar parts throughout the several views and the following specification.

10 is a tubular member having both ends threaded, respectively, at 11 and 12. A cap 13 is secured to the threaded end 11 which cap is provided with a tubular extension 14. Cap 13 is provided with a central bore 15, and its extension 14 is threaded interiorly at 16. 17 is a casing of, preferably, polygonal cross section. One end 18 of casing 17 is of reduced diameter and screw threaded to engage the corresponding thread 16 of cap 13, forming a pressure tight joint 19 with the end of tubular extension 14 of cap 13. The other end of casing 17 is similarly reduced and threaded at 20, for the purpose specified hereafter. Casing 17 is provided with a large central bore 21 extending partly through the same and meeting a similar smaller bore 22. 23 is a check valve of conventional design, adapted to seat at shoulder 24, formed by bores 21 and 22. A round stem 25 of check 23 extends through bore 22, is of smaller diameter than the same and projects outside of the casing, as shown. A pin 26, extending transversely across check valve casing 17, acts as a stop for the check 23, limiting its inward movement.

To end 12 of tubular member 10 is screwed a cap and check valve casing similar to the one just described, and the component parts of which I shall designate with the same numbers used above with the suffix "a," and which are, respectively, a cap 13$^a$, with central bore 15$^a$ and tubular extension 14$^a$, interiorly screw threaded at 16$^a$; a casing 17$^a$, with reduced end 18$^a$ making a joint with 14$^a$ at 19$^a$, and another screw threaded extension 20$^a$; central bores 21$^a$ and 22$^a$, a check valve 23$^a$ seating on shoulder 24$^a$, and a valve stem 25$^a$ extending beyond the end of casing 17$^a$, and a stop pin 26$^a$. All of these parts are substantially the same as the ones more fully described above.

For convenience sake the parts referred to by numbers 13 to 26 will be designated as the inlet terminal and the parts 13$^a$ to 26$^a$ as the outlet terminal.

A tubular sleeve 27 is interiorly screw threaded to engage threaded end 20$^a$ of casing 17$^a$. A rod 28, preferably of circular cross section, is driven transversely through tubular sleeve 27 at right angles to its axis and rigidly secured to the same. The outwardly projecting ends of rod 28 are of sufficient length to permit easy handling of the same and, in turn, the rotating of sleeve 27 on screw threaded end 20$^a$ for the reason hereinafter explained. The central portion 28$^a$ of rod 28 which extends transversely across the interior of sleeve 27 is adapted to engage the end of stem 25$^a$ of valve 23$^a$. To the exterior end of sleeve 27 is rigidly attached, preferably by screw thread and solder, a tubular member 29, which terminates into a funnel shaped nozzle 30. Parts 27 to 30, when referred to as a whole, will be designated as spout hereafter.

In the interior of tube 10, a cup shaped plunger washer 31, preferable of leather, is clamped between disks 32 and 33 and fastened to the end of a central stem 34 by means of a nut 35. To the other end of stem 34, toward the inlet terminal is secured a circular disk 36 of less diameter than the interior of the tube 10.

The operation of my device is as follows:

The outlet terminal is removed from tube 10 by unscrewing cap 13ª. Chamber 37 is then filled with grease or other lubricant. Cap 13ª is then replaced on tube 10.

An air pump (not shown) is then connected to threaded end 20 of the inlet terminal. A few strokes of the air pump will fill the chamber 38 with air, the latter passing into the chamber in the path indicated by arrows in Fig. 2. When this air pressure reaches a certain predetermined height, the pump is disconnected from the inlet terminal; the check 23 then closes outwardly and confines the air within the chamber 38, preventing any escape therefrom.

It can now readily be seen that the air within the chamber 38 exerts a pressure against the grease in chamber 37. If it is desired to eject a portion or all of the grease, it is only necessary to turn the spout onto the screw threaded portion 20ª by means of its handle members 28, until central part 28ª comes in contact with valve stem 25ª of check 23ª, when further movement of the spout will force the check 23ª off its seat, more or less, as desired. The compressed air in the chamber 38 will then exert sufficient pressure against the plunger washer 31 and, in turn, against the grease in chamber 37, to forcibly eject the same past the check 23ª, through bore 22ª and the interior of the spout, to any desired place.

It will be observed that, as soon as the spout is rotated outwardly far enough to break contact between rod 28ª and valve stem 25, the pressure within the tube 10 will close the check 23ª and maintain the same in such position.

When the apparatus is at rest, and it is desired to relieve the pressure in the air chamber 38, this is easily accomplished by pushing in the outwardly projecting end of valve stem 25, which opens the check 23 and enables the air to escape into the atmosphere.

It is obvious that, while I have above described my invention applied as a grease gun, its use and application may be widely varied and serve other purposes as well, wherever liquids or semi-solid materials are to be transported and transferred from time to time; or it may be used for spraying purposes by slightly modifying the shape of the outlet end of the spout to suit different conditions; also the connection to the air pump may be varied to suit different standards of hose couplings.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangements of parts may be resorted to, when required, without sacrificing any of the advantages of my invention, as defined in the appended claims.

What I claim as new is:

1. In a device of the character described, a tubular reservoir, and centrally alined therewith, a plunger, an inlet check, a self closing outlet check, and means to open the said outlet check, including a delivery spout having means to open the said outlet check by turning the spout on its axis.

2. In a device of the character described, a reservoir for storing a material to be ejected, a reservoir for confining an expansive gas, a movable partition separating the said reservoirs, a self closing inlet valve for the gas reservoir, a self closing outlet valve for the said storage reservoir, and a delivery spout and means in said spout to open said outlet valve by turning the spout on its axis.

3. In a device of the character described, the combination with a tubular reservoir, of a floating plunger, inlet and outlet terminals at both ends of the said reservoir, inwardly opening and self closing check valves within the said terminals, and a delivery spout having a central outlet, adapted to open the said check valve within the said outlet terminal, when being turned about its own axis.

4. A discharge medium for devices of the character described, comprising an annular cap, a casing in screw threaded engagement with the said cap, a check valve within the said casing, a valve stem projecting exteriorly from the said casing, a delivery spout adapted to be screwed onto the said casing, and a pin extending transversely through the said spout, adapted to be brought in contact with the said valve stem, and to move the said check valve off its seat.

5. In a device of the character described, the combination with a reservoir, of a floating plunger, inlet and outlet terminals at both ends of the said reservoir, and inwardly opening and self closing check valves within the said terminals, the said plunger being provided with a bar, and a disk at the extreme end of the said bar, adapted to maintain the said plunger a predetermined distance away from the said inlet terminal.

6. In a device of the character described, the combination of a reservoir, a floating plunger, inlet and outlet terminals, check valves within the said terminals, the check valve within the said inlet terminal adapted to be opened by pneumatic pressure.

7. In a device of the character described, the combination of a reservoir, a floating plunger, inlet and outlet check valves, the said inlet check valve adapted to be opened by pneumatic pressure, and the said outlet check valve adapted to be opened by manual means.

8. In a device of the character described, the combination of a reservoir, a floating plunger, inlet and outlet check valves, the said check valves adapted to be opened by external pressure and to be closed by internal pressure.

In testimony whereof I have hereunto set my hand in presence of two subscribing witnesses.

ALBERT W. MORSE.

Witnesses:
W. H. BEVAN,
WILLIAM DENT.